(12) United States Patent
Okuyama et al.

(10) Patent No.: US 11,077,601 B2
(45) Date of Patent: Aug. 3, 2021

(54) LIQUID-CONTAINING CONTAINER MANUFACTURING METHOD

(71) Applicant: YOSHINO KOGYOSHO CO., LTD., Tokyo (JP)

(72) Inventors: Yuichi Okuyama, Tokyo (JP); Mitsuru Shiokawa, Tokyo (JP); Shigeki Morikami, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 99 days.

(21) Appl. No.: 16/620,826

(22) PCT Filed: May 17, 2018

(86) PCT No.: PCT/JP2018/019154
§ 371 (c)(1),
(2) Date: Dec. 9, 2019

(87) PCT Pub. No.: WO2019/003698
PCT Pub. Date: Jan. 3, 2019

(65) Prior Publication Data
US 2020/0361133 A1 Nov. 19, 2020

(30) Foreign Application Priority Data
Jun. 28, 2017 (JP) .............................. JP2017-126658

(51) Int. Cl.
*B29C 49/46* (2006.01)
*B29C 49/12* (2006.01)
(Continued)

(52) U.S. Cl.
CPC .............. *B29C 49/12* (2013.01); *B29C 49/06* (2013.01); *B29C 49/46* (2013.01);
(Continued)

(58) Field of Classification Search
CPC ......... B29C 49/06; B29C 49/12; B29C 49/46; B29C 2049/4664; B29C 2049/465; B29C 2049/4655; B29C 49/4268
See application file for complete search history.

(56) References Cited

U.S. PATENT DOCUMENTS

| | | | |
|---|---|---|---|
| 10,940,631 B2* | 3/2021 | Okuyama | B29C 49/46 |
| 2020/0171733 A1* | 6/2020 | Shiokawa | B29C 49/12 |
| 2021/0039302 A1* | 2/2021 | Hoshino | B29C 49/46 |

FOREIGN PATENT DOCUMENTS

| | | |
|---|---|---|
| DE | 10 2011 012 665 A1 | 8/2012 |
| JP | 5806929 B2 | 11/2015 |

(Continued)

OTHER PUBLICATIONS

Feb. 5, 2021 Extended Search Report issued in European Patent Application No. 18824982.5.
(Continued)

*Primary Examiner* — Robert B Davis
(74) *Attorney, Agent, or Firm* — Oliff PLC

(57) ABSTRACT

A liquid-containing container manufacturing method includes: an air discharge step of discharging air inside a preform, by opening a preliminary supply path by an opening-closing body in a state in which a seal body is at a closed position to supply a liquid into the preform; and a liquid blow molding step of molding the preform into a liquid-containing container, by moving the seal body from the closed position to a open position to supply the liquid pressurized into the preform through a seat part.

8 Claims, 8 Drawing Sheets

(51) Int. Cl.
*B29C 49/06* (2006.01)
*B29K 23/00* (2006.01)
*B29K 67/00* (2006.01)
*B29L 31/00* (2006.01)

(52) U.S. Cl.
CPC .... *B29K 2023/12* (2013.01); *B29K 2067/003* (2013.01); *B29L 2031/7158* (2013.01)

(56) References Cited

FOREIGN PATENT DOCUMENTS

| | | | |
|---|---|---|---|
| JP | 2017-094685 A | 6/2017 | |
| JP | 2017-094686 A | 6/2017 | |
| JP | 2017-109410 A | 6/2017 | |
| WO | WO-2019130781 A1 * | 7/2019 | ............. B29C 49/46 |

OTHER PUBLICATIONS

Jun. 19, 2018 International Search Report issued in International Patent Application No. PCT/JP2018/019154.

* cited by examiner

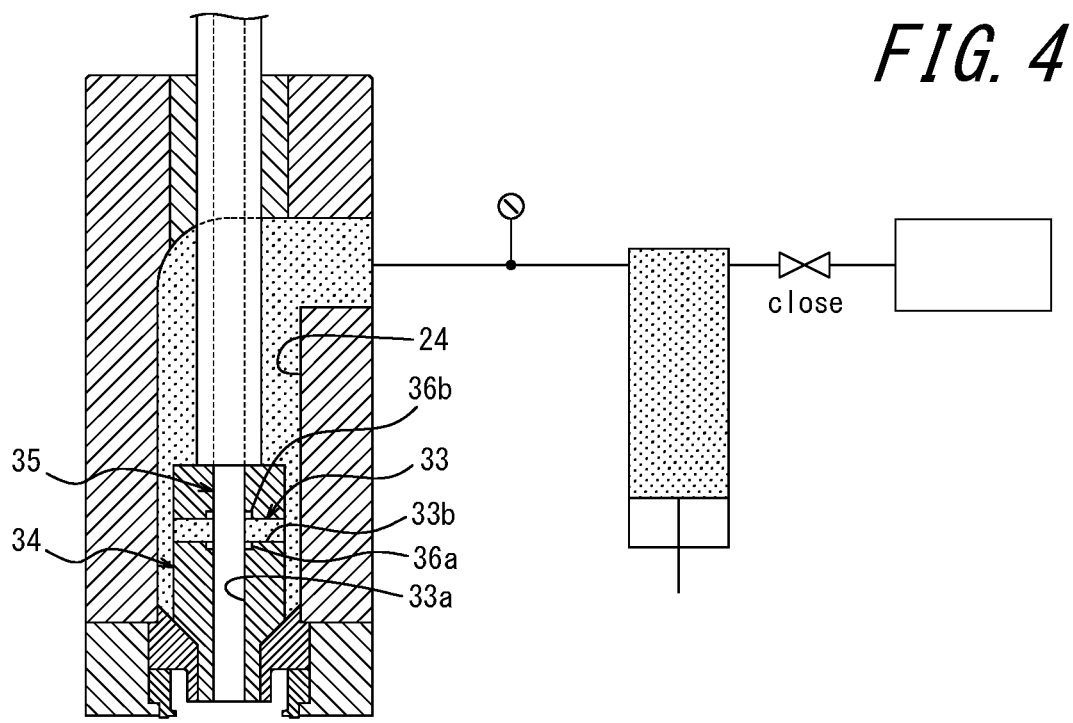
FIG. 4
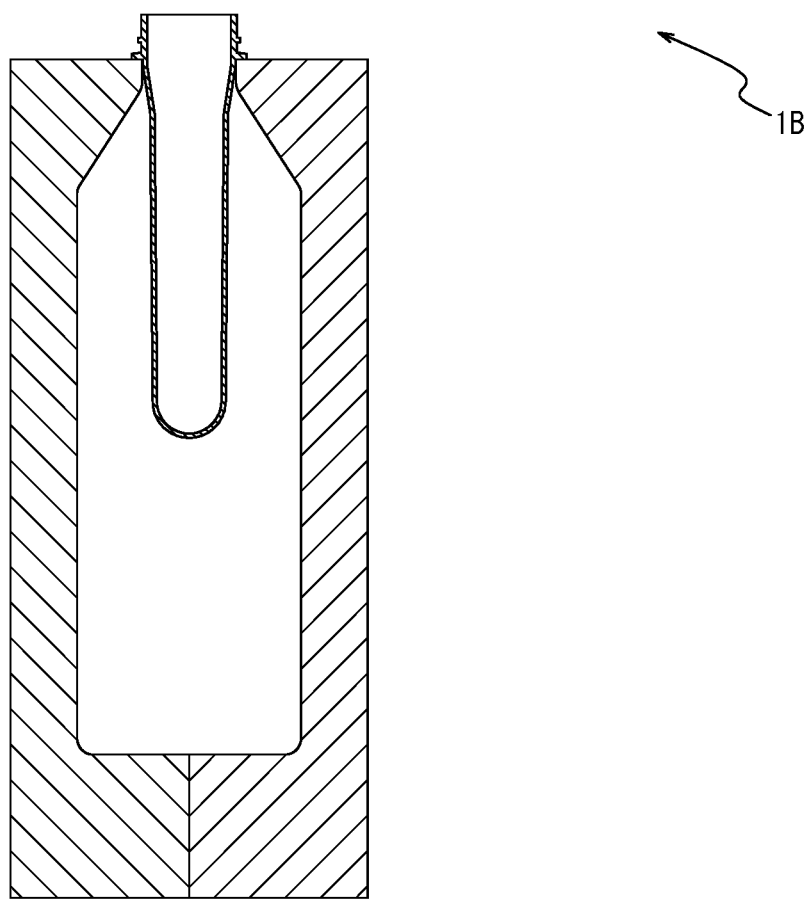

LIQUID-CONTAINING CONTAINER MANUFACTURING METHOD

TECHNICAL FIELD

The present disclosure relates to a liquid-containing container manufacturing method of manufacturing a liquid-containing container containing a content liquid from a synthetic resin-made preform.

BACKGROUND

Synthetic resin-made containers such as bottles made of polypropylene (PP) and bottles made of polyethylene terephthalate (PET) are used to contain, as content liquids, various liquids including beverages, cosmetics, medicines, detergents, and toiletries such as shampoos. Such a container is typically manufactured by blow molding a preform made of a thermoplastic synthetic resin material such as the above-mentioned materials.

As a blow molding method of molding a preform into a container, liquid blow molding using a pressurized liquid instead of pressurized air as a pressurized medium supplied into a preform is known.

For example, PTL 1 describes a liquid blow molding method whereby a synthetic resin-made preform preheated to a temperature at which stretchability is developed is placed in a mold for blow molding and a liquid pressurized to a predetermined pressure is supplied into the preform through a blow nozzle using a pump to mold the preform into a container of a predetermined shape along the cavity of the mold for blow molding.

With this liquid blow molding method, a content liquid to be contained in the container as a product, such as a beverage, can be used as the liquid supplied into the preform to simultaneously mold the container and fill the container with the content liquid, thus manufacturing a liquid-containing container containing the content liquid. Therefore, a liquid-containing container manufacturing method using liquid blow molding can manufacture a liquid-containing container at low cost, with no need for a step of filling the molded container with the content liquid.

CITATION LIST

Patent Literature

PTL 1: JP 5806929 B2

SUMMARY

Technical Problem

With the conventional liquid blow molding method described above, however, the liquid as the pressurized medium is supplied into the preform while entraining air present inside the preform. There is thus a possibility that bubbling of the liquid, for example, causes decreases in the stability of molding conditions, the container moldability, and the like.

It could therefore be helpful to provide a liquid-containing container manufacturing method that can manufacture a liquid-containing container to have a predetermined content amount and shape accurately and at low cost.

Solution to Problem

A liquid-containing container manufacturing method according to the present disclosure is a liquid-containing container manufacturing method of manufacturing a liquid-containing container containing a content liquid from a synthetic resin-made preform using a mold for blow molding and a nozzle unit that includes: a nozzle unit body having an annular seat part provided in a supply path of a liquid; a seal body movable between a closed position at which the seat part is closed and an open position at which the seat part is open; and an opening-closing body capable of opening and closing a preliminary supply path that is formed inside the seal body and communicates with a part of the supply path upstream from the seat part, the liquid-containing container manufacturing method comprising: an air discharge step of discharging air inside the preform placed in the mold for blow molding to outside, by opening the preliminary supply path by the opening-closing body in a state in which the seal body is at the closed position to supply the liquid from the preliminary supply path into the preform; and a liquid blow molding step of molding the preform into the liquid-containing container of a shape along an inner surface of the mold for blow molding, by moving the seal body from the closed position to the open position to supply the liquid pressurized into the preform through the seat part.

Preferably, the liquid-containing container manufacturing method according to the present disclosure further comprises a rod stretching step of stretching the preform in an axial direction by a stretching rod, before or during the liquid blow molding step, wherein the opening-closing body is the stretching rod.

Preferably, in the liquid-containing container manufacturing method according to the present disclosure, in the air discharge step, the opening-closing body is moved in a projecting direction to open the preliminary supply path.

Preferably, in the liquid-containing container manufacturing method according to the present disclosure, in the air discharge step, the opening-closing body is moved in a retracting direction to open the preliminary supply path.

Preferably, in the liquid-containing container manufacturing method according to the present disclosure, a depression that extends from a distal end toward a proximal end of the opening-closing body and is continuous or intermittent in a circumferential direction is formed on an outer peripheral surface of the opening-closing body.

Advantageous Effect

It is thus possible to provide a liquid-containing container manufacturing method that can manufacture a liquid-containing container to have a predetermined content amount and shape accurately and at low cost.

BRIEF DESCRIPTION OF THE DRAWINGS

In the accompanying drawings:

FIG. 4 is an explanatory diagram illustrating an example of a liquid-containing container manufacturing device used in a liquid blow molding method which is Embodiment 2 of the present disclosure, in a state in which a preform is placed in a mold for blow molding;

DETAILED DESCRIPTION

More detailed description will be given below with reference to the drawings.

A liquid-containing container manufacturing method which is Embodiment 1 of the present disclosure will be described below, with reference to FIGS. 1 to 3.

The liquid-containing container manufacturing method which is Embodiment 1 of the present disclosure is a liquid-containing container manufacturing method of manufacturing a liquid-containing container containing a content liquid from a synthetic resin-made preform using a mold for blow molding and a nozzle unit that includes: a nozzle unit body having an annular seat part provided in a supply path of a liquid; a seal body movable between a closed position at which the seat part is closed and an open position at which the seat part is open; and an opening-closing body capable of opening and closing a preliminary supply path that is formed inside the seal body and communicates with a part of the supply path upstream from the seat part, the liquid-containing container manufacturing method comprising: an air discharge step of discharging air inside the preform placed in the mold for blow molding to outside, by opening the preliminary supply path by the opening-closing body in a state in which the seal body is at the closed position to supply the liquid from the preliminary supply path into the preform; and a liquid blow molding step of molding the preform into the liquid-containing container of a shape along an inner surface of the mold for blow molding, by moving the seal body from the closed position to the open position to supply the liquid pressurized into the preform through the seat part.

The liquid-containing container manufacturing method according to this embodiment further comprises a rod stretching step of stretching the preform in an axial direction by a stretching rod, before or during the liquid blow molding step, wherein the opening-closing body is the stretching rod.

In the liquid-containing container manufacturing method according to this embodiment, in the air discharge step, the opening-closing body is moved in a projecting direction to open the preliminary supply path.

Figure 1:
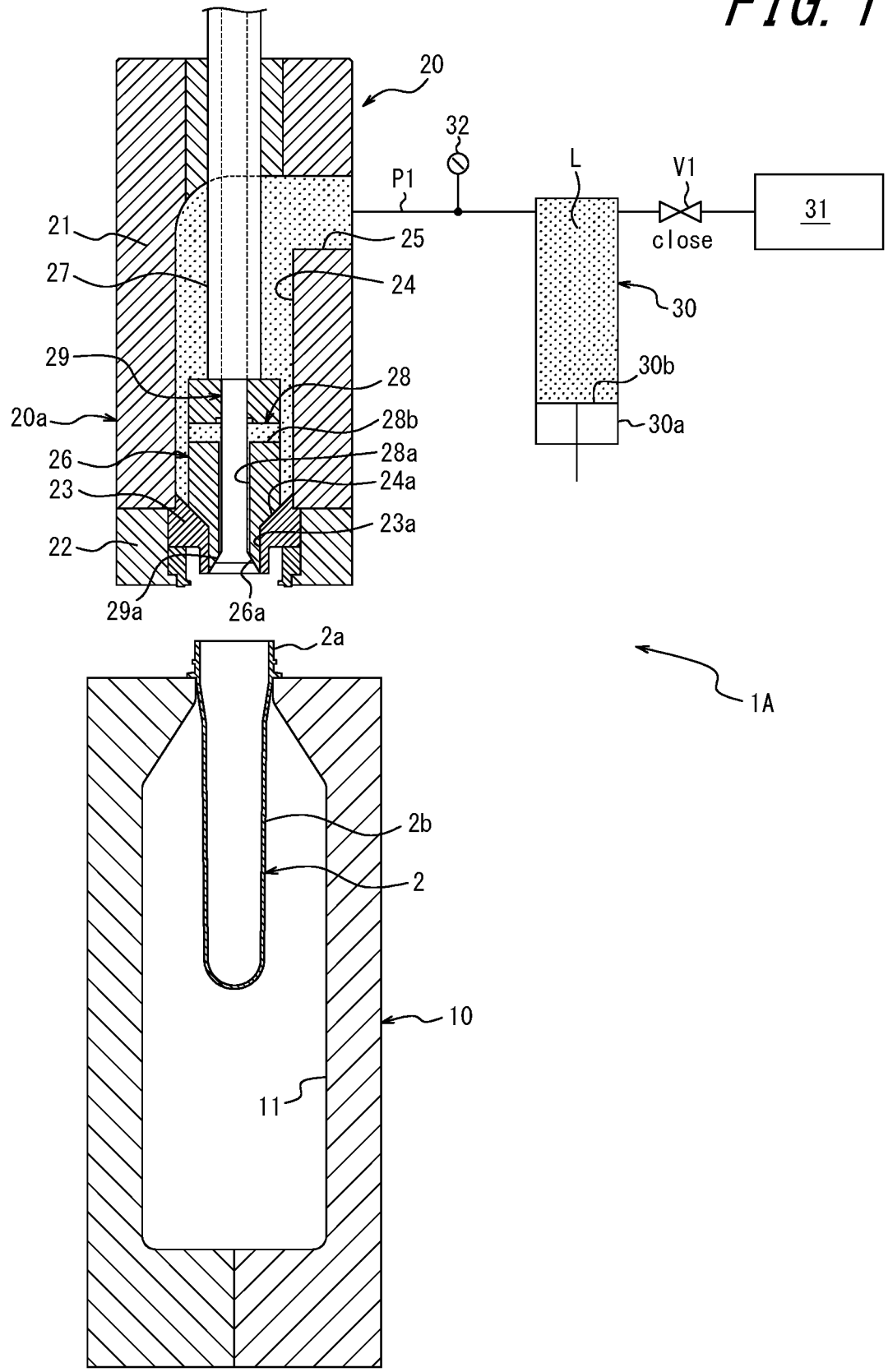
FIG. 1 is an explanatory diagram illustrating an example of a liquid-containing container manufacturing device used in a liquid blow molding method which is Embodiment 1 of the present disclosure, in a state in which a preform is placed in a mold for blow molding.

Such a liquid-containing container manufacturing method according to this embodiment can be implemented, for example, using a liquid-containing container manufacturing device 1A of a structure illustrated in FIG. 1.

The liquid-containing container manufacturing device 1A illustrated in FIG. 1 manufactures a liquid-containing container C (see FIG. 3) containing a content liquid from a synthetic resin-made preform 2. A liquid (content liquid) L contained in the liquid-containing container C may be any of various liquids L such as beverages, cosmetics, medicines, detergents, and toiletries such as shampoos.

The preform 2 is, for example, made of a thermoplastic synthetic resin material such as polypropylene (PP) or polyethylene terephthalate (PET), and shaped like a bottomed cylinder having a cylindrical mouth part 2a forming an open end and a cylindrical barrel part 2b connected to the mouth part 2a and closed at its lower end.

Although not specifically illustrated, the outer wall surface of the mouth part 2a has an engaging protrusion for attaching a closure cap (not illustrated) to the mouth part 2a of the molded liquid-containing container C by capping (undercut engagement). Instead of the engaging protrusion, the outer wall surface of the mouth part 2a may have an external thread to attach a closure cap to the mouth part 2a by screw connection.

The liquid-containing container manufacturing device 1A includes a mold 10 for blow molding. The mold 10 for blow molding has a cavity 11 whose shape corresponds to the final shape of the liquid-containing container C such as a bottle shape. The cavity 11 is open upward at the upper surface of the mold 10 for blow molding. The preform 2 is placed in the mold 10 for blow molding with the barrel part 2b being located inside the cavity 11 of the mold 10 for blow molding and the mouth part 2a projecting upward from the mold 10 for blow molding.

The mold 10 for blow molding is openable right and left. By opening the mold 10 for blow molding right and left after molding the preform 2 into the liquid-containing container C, the liquid-containing container C can be taken out of the mold 10 for blow molding.

A nozzle unit 20 for supplying the pressurized liquid L into the preform 2 is provided above the mold 10 for blow molding. The nozzle unit 20 includes a main block 21.

Figure 2:
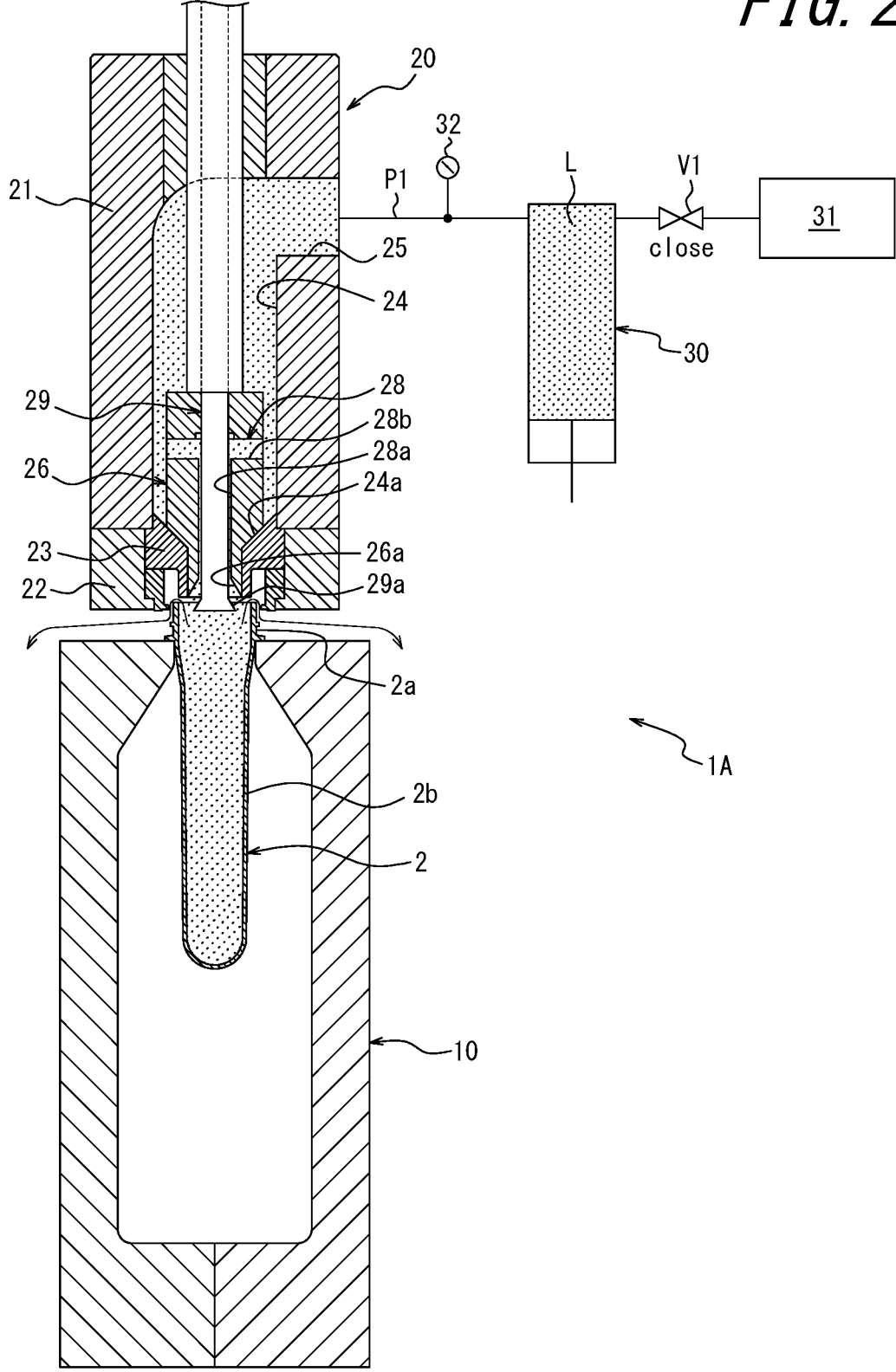
FIG. 2 is an explanatory diagram illustrating the liquid-containing container manufacturing device in a state in which an air discharge step is performed according to Embodiment 1 of the present disclosure.

As illustrated in FIG. 2, a support block 22 is provided at the lower end of the main block 21. The support block 22 supports a blow nozzle 23 attached to the lower end of the main block 21. The blow nozzle 23 is approximately cylindrical, and has a liquid supply port 23a on the inner side of its lower end. The main block 21, the support block 22, and the blow nozzle 23 constitute a nozzle unit body 20a. The nozzle unit body 20a is movable in the vertical direction relative to the mold 10 for blow molding. When the nozzle unit body 20a is lowered to the lower stroke end, the nozzle unit body 20a (more specifically, the blow nozzle 23) engages with the mouth part 2a of the preform 2 placed in the mold 10 for blow molding from above in a sealing state.

A supply path 24 extending in the vertical direction is formed inside the nozzle unit body 20a (more specifically, the main block 21 and the blow nozzle 23). The liquid supply port 23a of the blow nozzle 23 is formed at the lower end of the supply path 24.

The nozzle unit body 20a (more specifically, the main block 21) also has a supply port 25 communicating with the upper end of the supply path 24, as illustrated in FIG. 1.

The nozzle unit body 20a (more specifically, the blow nozzle 23) has an annular (ring-shaped) seat part 24a provided in the supply path 24. The annular seat part 24a is formed by the upper surface of the blow nozzle 23. The annular seat part 24a may be formed by the inner peripheral surface of the blow nozzle 23, or formed by the upper surface and the inner peripheral surface of the blow nozzle 23. The annular seat part 24a is formed by a tapered surface shaped like a downward-pointing cone, although the shape of the annular seat part 24a may be changed as appropriate. A seal body 26 for opening and closing the seat part 24a is placed inside the supply path 24. The seal body 26 is movable between a closed position at which the seat part 24a is closed and an open position at which the seat part 24a is open. The seal body 26 is fixed to a shaft body 27 that is movable in the vertical direction relative to the nozzle unit body 20a, and is movable in the vertical direction inside the supply path 24. The seal body 26 may be formed integrally with the shaft body 27.

The seal body 26 is cylindrical. When the seal body 26 moves to the closed position which is the lower stroke end position, the lower end surface of the seal body 26 comes into contact with the upper surface of the blow nozzle 23 (i.e. the seat part 24a), to close the seat part 24a. When the seal body 26 moves upward from the closed position, the lower end surface of the seal body 26 separates from the upper surface of the blow nozzle 23 (i.e. the seat part 24a), to open the seat part 24a (see FIG. 3).

A preliminary supply path 28 communicating with a part of the supply path 24 upstream from the seat part 24a is formed inside the seal body 26. The preliminary supply path 28 is made up of a vertical flow path 28a extending in the vertical direction and a horizontal flow path 28b extending in the radial direction from the vertical flow path 28a. The horizontal flow path 28b extends in the radial direction from an upper end part of the vertical flow path 28a. The horizontal flow path 28b may extend in the radial direction from an intermediate part of the vertical flow path 28a in the vertical direction. The horizontal flow path 28b is made up of a plurality of flow paths provided intermittently in the circumferential direction. The horizontal flow path 28b may be made up of a single flow path. A preliminary supply port 26a is located on the inner side of the lower end of the seal body 26. The preliminary supply port 26a forms the lower end of the preliminary supply path 28 (i.e. its vertical flow path 28a). The preliminary supply port 26a is formed by a conical tapered surface that increases in diameter in the downward direction.

The nozzle unit 20 has an opening-closing body 29 capable of opening and closing the preliminary supply path 28. The opening-closing body 29 made of a steel material or the like and having an approximately columnar shape is inserted in the axial center of the shaft body 27, and passes through the axial center of the seal body 26 and extends into the preliminary supply path 28 (more specifically, into the vertical flow path 28a). The opening-closing body 29 is movable in the vertical direction relative to the shaft body 27 and the seal body 26 when driven by a drive source (not illustrated). In this embodiment, the opening-closing body 29 has an opening-closing part 29a that can open the preliminary supply path 28 by moving the opening-closing body 29 in the projecting direction (i.e. lowering the opening-closing body 29). The opening-closing part 29a is formed at the lower end of the opening-closing body 29. The opening-closing part 29a can close the preliminary supply port 26a of the preliminary supply path 28 by coming into contact with the preliminary supply port 26a of the seal body 26, and open the preliminary supply path 28 by separating from the preliminary supply port 26a of the seal body 26 (see FIG. 2). The opening-closing part 29a is formed by a conical tapered surface having the same inclination as the preliminary supply port 26a formed by a conical tapered surface.

A cylindrical gap that is continuous in the circumferential direction and through which the liquid L can pass is formed between the vertical flow path 28a of the preliminary supply path 28 and the opening-closing body 29. Alternatively, a plurality of gaps that are arranged intermittently in the circumferential direction and through which the liquid L can pass may be formed between the vertical flow path 28a of the preliminary supply path 28 and the opening-closing body 29, or one gap that is formed only in one part in the circumferential direction and through which the liquid L can pass may be formed between the vertical flow path 28a of the preliminary supply path 28 and the opening-closing body 29.

The opening-closing body 29 may be used as a stretching rod, as in this embodiment. As a result of the opening-closing body 29 moving downward and appearing from the lower end of the seal body 26, the preform 2 can be stretched in the axial direction.

The supply port 25 is connected to a pressurized liquid supply source 30 through a piping P1. The pressurized liquid supply source 30 can be formed, for example, by a plunger pump including a cylinder 30a and a piston (plunger) 30b.

The pressurized liquid supply source 30 is connected to a supply tank 31. The supply tank 31 can contain the liquid L, and heat the liquid L to a predetermined temperature and hold it at the temperature. An on-off valve V1 is provided in the flow path between the pressurized liquid supply source 30 and the supply tank 31. The flow path can be opened and closed by the on-off valve V1. Reference sign 32 is a pressure gauge provided in the piping P1.

Figure 3:
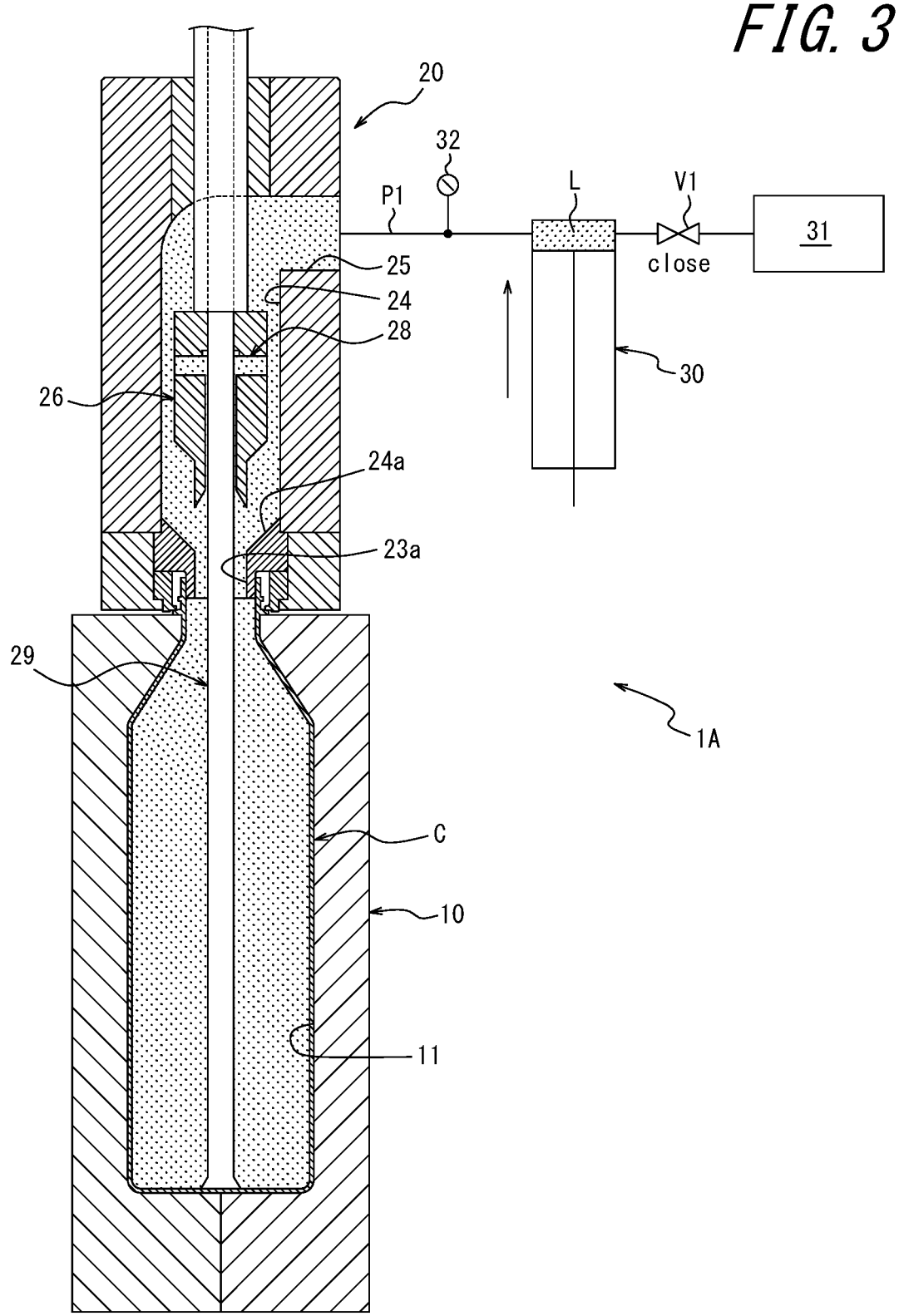
FIG. 3 is an explanatory diagram illustrating the liquid-containing container manufacturing device in a state in which a rod stretching step and a liquid blow molding step are performed according to Embodiment 1 of the present disclosure.

The pressurized liquid supply source 30 can supply the liquid L pressurized to a predetermined pressure into the preform 2 through the piping P1, the supply port 25, and the supply path 24 (i.e. its seat part 24a and liquid supply port 23a), by operating in the forward direction (pressurization direction) in a state in which the nozzle unit 20 (more specifically, the blow nozzle 23) engages with the mouth part 2a of the preform 2 placed in the mold 10 for blow molding in a sealing state and the seat part 24a is open as a result of the seal body 26 moving upward to the open position (see FIG. 3). In a state in which the preliminary supply path 28 is opened by the opening-closing body 29 as illustrated in FIG. 2, the pressurized liquid supply source 30 may not operate in the forward direction (pressurization direction). In this case, the liquid L is supplied into the preform 2 from the preliminary supply path 28 only by gravitation. In a state in which the preliminary supply path 28 is opened by the opening-closing body 29 as illustrated in FIG. 2, the pressurized liquid supply source 30 may operate in the forward direction (pressurization direction). In this case, the pressurized liquid L can be supplied into the preform 2 through the piping P1, the supply port 25, the supply path 24, and the preliminary supply path 28. The pressure of the liquid L in this case may be lower than the predetermined pressure.

The pressurized liquid supply source 30 can suck the liquid L contained in the supply tank 31 into the cylinder 30a to prepare for the next liquid blow molding, by operating in the backward direction in a state in which the seat part 24a is closed by the seal body 26, the preliminary supply path 28 is closed by the opening-closing body 29, and the on-off valve V1 is open.

The operations of the nozzle unit body 20a, the seal body 26, the opening-closing body (stretching rod) 29, the pressurized liquid supply source 30, the on-off valve V1, etc. are controlled by a control device (not illustrated) in an integrated manner. This control can be performed with reference to the value of the pressure gauge 32 and the like. The on-off valve V1 is preferably an electromagnetic valve controllable by the control device.

A method (liquid-containing container manufacturing method according to this embodiment) of molding, from the synthetic resin-made preform 2, the liquid-containing container C which is a container of a predetermined shape containing the liquid (content liquid) L using the liquid-containing container manufacturing device 1A having such a structure will be described below.

First, the preform 2 preheated to such a predetermined temperature (e.g. 80° C. to 150° C.) at which stretchability is developed using a heating means such as a heater (not illustrated) is placed in the mold 10 for blow molding and the mold 10 for blow molding is clamped, as illustrated in FIG. 1.

At this time, the nozzle unit 20 is above and separate from the mold 10 for blow molding, and the seat part 24a is closed by the seal body 26 and the preliminary supply path 28 is closed by the opening-closing body 29. The mouth part 2a of the preform 2 is open, and accordingly the preform 2 is filled with air.

Next, an air discharge step is performed. As illustrated in FIG. 2, in the air discharge step, the nozzle unit 20 is lowered to a position immediately before the nozzle unit 20 (i.e. its blow nozzle 23) engages with the mouth part 2a of the preform 2, and, in this state, the opening-closing body (stretching rod) 29 is moved in the projecting direction (lowered) to open the preliminary supply path 28 and supply the liquid L into the preform 2 from the preliminary supply path 28, thus discharging air inside the preform 2 to the outside. That is, by supplying the liquid L into the preform 2, most of the air filling the preform 2 is forced out of the preform 2, i.e. discharged, by the liquid L.

After the air discharge step ends, a liquid blow molding step is performed. In the liquid blow molding step, first, the nozzle unit 20 is lowered to cause the nozzle unit 20 (i.e. its blow nozzle 23) to engage with the mouth part 2a of the preform 2. Following this, the seal body 26 is raised to open the seat part 24a. In this state, the pressurized liquid supply source 30 operates in the forward direction to supply the liquid L pressurized to the predetermined pressure into the preform 2 through the seat part 24a. Thus, the pressurized liquid L is supplied into the preform 2 to mold the preform 2 into the liquid-containing container C of the predetermined shape along the inner surface of the cavity 11 of the mold 10 for blow molding by the pressure of the liquid L (see FIG. 3).

This liquid blow molding step is performed in a state in which most of the air inside the preform 2 has been discharged to the outside as a result of the air discharge step. Therefore, when the pressurized liquid L is supplied into the preform 2, the liquid L does not entrain air, and thus mixing of air into the liquid L inside the liquid-containing container C is prevented. In the air discharge step, the liquid L is supplied into the preform 2 not through the annular seat part 24a but through the preliminary supply path 28 formed inside the seal body 26. The circumferential length of the whole open portion in the preliminary supply path 28 when supplying the liquid L through the preliminary supply path 28 can be shorter than the circumferential length of the whole open portion in the annular seat part 24a when supplying the liquid L through the annular seat part 24a. Moreover, the radial dimension of the whole open portion in the preliminary supply path 28 when supplying the liquid L through the preliminary supply path 28 can be smaller than the radial dimension of the whole open portion in the annular seat part 24a when supplying the liquid L through the annular seat part 24a. Hence, deflection in the flow of the liquid L in the open portion of the preliminary supply path 28 in the circumferential direction can be prevented. Thus, according to this embodiment, mixing of air from the open portion into the supply path 24 when supplying the liquid L in the air discharge step can be prevented.

A rod stretching step may be performed during the liquid blow molding step, as in this embodiment. In the rod stretching step, the opening-closing body (stretching rod) 29 is moved downward to stretch the barrel part 2b of the preform 2 in the axial direction (longitudinal direction) by the stretching rod 29. The liquid blow molding step may be performed after the rod stretching step. By performing the liquid blow molding step after or during the rod stretching step (the rod stretching step may be started after the start of the liquid blow molding step), biaxial stretching blow molding, i.e. blow molding the preform 2 while stretching it in the axial direction by the stretching rod 29, can be carried out. Consequently, the preform 2 can be molded into the liquid-containing container C of the predetermined shape more accurately. Alternatively, the liquid blow molding step may be performed without the rod stretching step. In the case where the opening-closing body 29 is used as the stretching rod, the liquid L is supplied in the liquid blow molding step in a state in which both the seat part 24a and the preliminary supply path 28 are open. In the case where the rod stretching step is not performed, on the other hand, the liquid L may be supplied by opening the seat part 24a in a state in which the preliminary supply path 28 is closed. Alternatively, in the case where the rod stretching step is not performed, the liquid L may be supplied by opening the seat part 24a in a state in which the preliminary supply path 28 is open.

After the liquid blow molding step ends, the seal body 26 is lowered to close the seat part 24a and the opening-closing body 29 is raised to close the preliminary supply path 28, and the nozzle unit 20 is moved upward relative to the mold 10 for blow molding to separate the nozzle unit 20 (i.e. its blow nozzle 23) from the liquid-containing container C (i.e. its mouth part 2a). After the liquid blow molding step and before separating the nozzle unit 20 from the liquid-containing container C, an additional step for forming a headspace in the liquid-containing container C (e.g. a suck back step of operating the pressurized liquid supply source 30 in the backward direction (suction direction) by a predetermined amount in a state in which the seat part 24a is opened by the seal body 26 to suck a predetermined amount of the liquid L from the inside of the molded liquid-containing container C back to the supply path 24) may be performed. The mold 10 for blow molding is opened to take the completed liquid-containing container C out of the mold 10 for blow molding. A closure cap is then attached to the mouth part 2a of the liquid-containing container C, to obtain a product. Here, the pressurized liquid supply source 30 operates in the backward direction in a state in which the on-off valve V1 is open, to suck the liquid L contained in the supply tank 31 into the cylinder 30a. The mold 10 for blow molding may be opened to take the liquid-containing container C out of the mold 10 for blow molding after attaching the closure cap to the mouth part 2a.

As described above, with the liquid-containing container manufacturing method according to this embodiment, the liquid blow molding step is performed after air inside the preform 2 is discharged to the outside in the air discharge step. Therefore, when the pressurized liquid L is supplied into the preform 2 in the liquid blow molding step, mixing of air into the liquid L can be prevented. Moreover, with the liquid-containing container manufacturing method according to this embodiment, the liquid L is supplied into the preform 2 through the preliminary supply path 28 in the air discharge step. Therefore, mixing of air into the supply path 24 when supplying the liquid L can be prevented. Thus, according to this embodiment, decreases in the stability of molding conditions, the container moldability, and the like caused by, for example, bubbling of the liquid L inside the preform 2 or mixing of air into the supply path 24 can be prevented in liquid blow molding, so that the liquid-containing container C can be manufactured to have a predetermined content amount and shape accurately and at low cost.

Furthermore, with the liquid-containing container manufacturing method according to this embodiment, the opening-closing body 29 for performing the air discharge step is also used as the stretching rod. The structure for performing the air discharge step can thus be simplified, and the related cost can be reduced.

Figure 5:
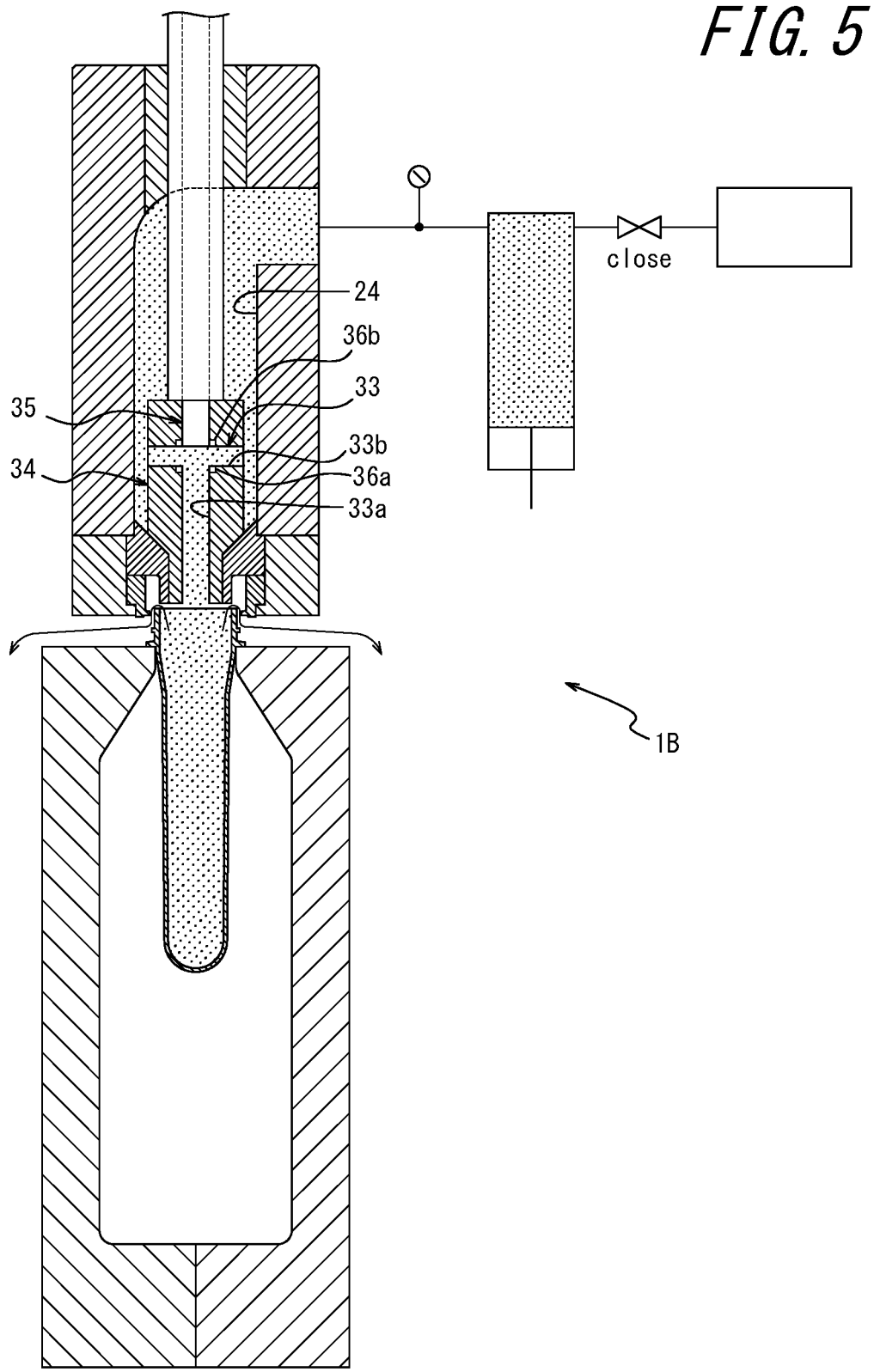
FIG. 5 is an explanatory diagram illustrating the liquid-containing container manufacturing device in a state in which an air discharge step is performed according to Embodiment 2 of the present disclosure.

A liquid-containing container manufacturing method which is Embodiment 2 of the present disclosure will be described below, with reference to FIGS. 4 to 5.

In the liquid-containing container manufacturing method which is Embodiment 2 of the present disclosure, in the air discharge step, the opening-closing body is moved in a retracting direction to open the preliminary supply path. The other structures are the same as those in Embodiment 1 of the present disclosure.

Such a liquid-containing container manufacturing method according to this embodiment can be implemented, for example, using a liquid-containing container manufacturing device 1B of a structure illustrated in FIG. 4.

The liquid-containing container manufacturing device 1B has a seal body 34 having a preliminary supply path 33 formed inside. The preliminary supply path 33 in this embodiment is made up of a vertical flow path 33a extending in the vertical direction and a horizontal flow path 33b extending in the radial direction from an upper end part of the vertical flow path 33a. The liquid-containing container manufacturing device 1B has an opening-closing body 35 capable of opening and closing the preliminary supply path 33. The opening-closing body 35 serving also as a stretching rod extends in the vertical direction, and extends into the preliminary supply path 33 (more specifically, into the vertical flow path 33a). In the preliminary supply path 33 (more specifically, the vertical flow path 33a), an annular seal part 36a that can provide sealing between the preliminary supply path 33 and the opening-closing body 35 over the whole circumference is formed. The annular seal part 36a is located in a downstream part of the connecting portion between the vertical flow path 33a and the horizontal flow path 33b. Alternatively, the annular seal part 36a may be located downstream from the connecting portion between the vertical flow path 33a and the horizontal flow path 33b. An upper annular seal part 36b that can provide sealing between the vertical flow path 33a and the opening-closing body 35 over the whole circumference is located in an upstream part of the connecting portion between the vertical flow path 33a and the horizontal flow path 33b. Alternatively, the upper annular seal part 36b may be located upstream from the connecting portion between the vertical flow path 33a and the horizontal flow path 33b. The other structures are the same as those in the liquid-containing container manufacturing device 1A used in Embodiment 1.

With the liquid-containing container manufacturing method according to this embodiment, in the air discharge step, the opening-closing body 35 is moved in the retracting direction until the lower end of the opening-closing body 35 passes through the annular seal part 36a, to open the preliminary supply path 33. More specifically, in the air discharge step in this embodiment, the opening-closing body 35 is moved in the retracting direction until the lower end of the opening-closing body 35 reaches the upper annular seal part 36b to fully open the vertical flow path 33a, as illustrated in FIG. 5. Hence, deflection in the flow of the liquid L in the vertical flow path 33a in the circumferential direction can be further prevented, as compared with the case where the cylindrical gap is formed between the vertical flow path 28a and the opening-closing body 29 as in Embodiment 1. Thus, according to this embodiment, mixing of air into the supply path 24 can be further prevented as compared with Embodiment 1.

A liquid-containing container manufacturing method which is Embodiment 3 of the present disclosure will be described below, with reference to FIGS. 6 to 7.

In the liquid-containing container manufacturing method which is Embodiment 3 of the present disclosure, the opening-closing body has, on its outer peripheral surface, a depression that extends from the distal end toward the proximal end of the opening-closing body and is continuous in the circumferential direction. The other structures are the same as those in Embodiment 2 of the present disclosure.

Figure 6:
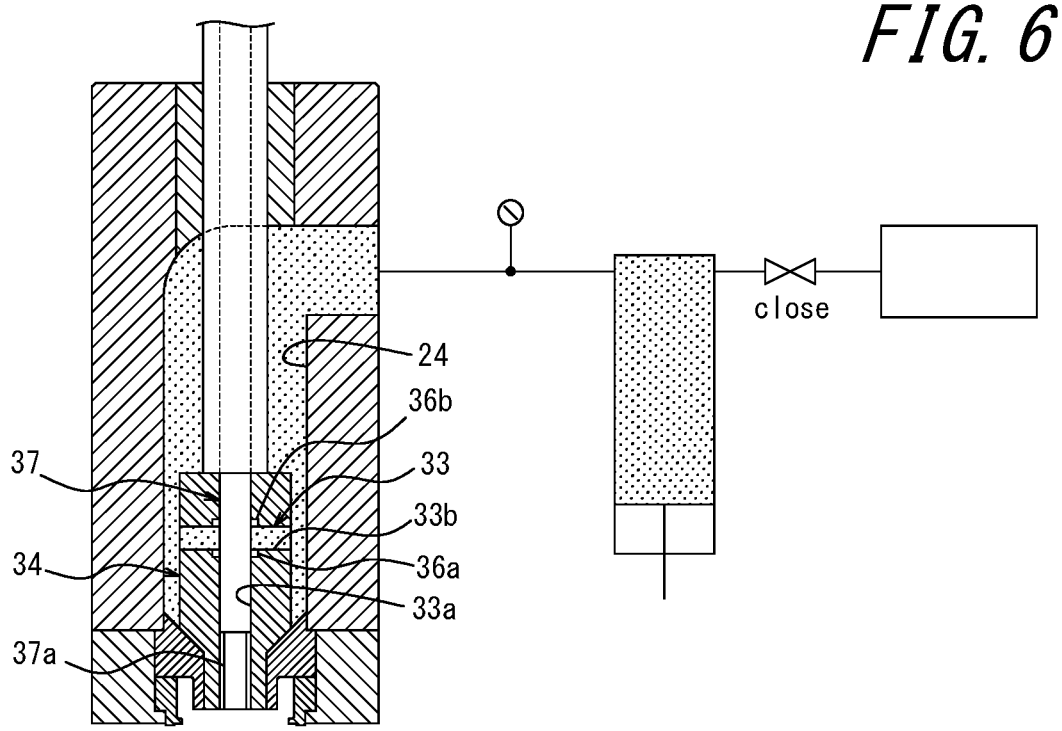
FIG. 6 is an explanatory diagram illustrating an example of a liquid-containing container manufacturing device used in a liquid blow molding method which is Embodiment 3 of the present disclosure, in a state in which a preform is placed in a mold for blow molding.
Figure 6:
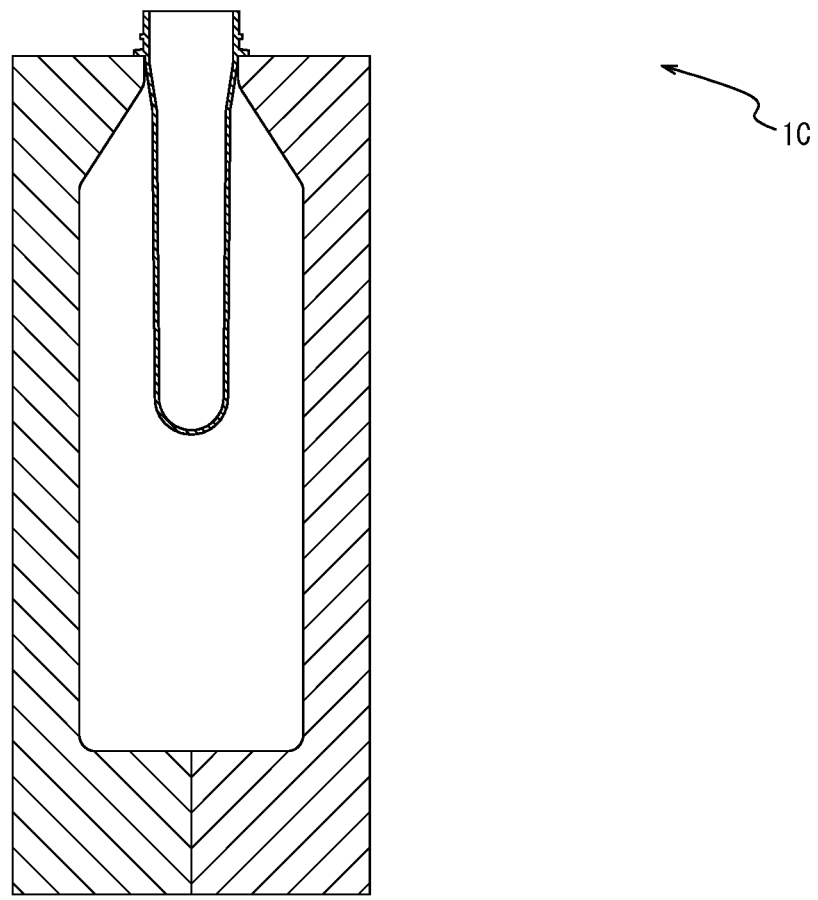
Figure 7:
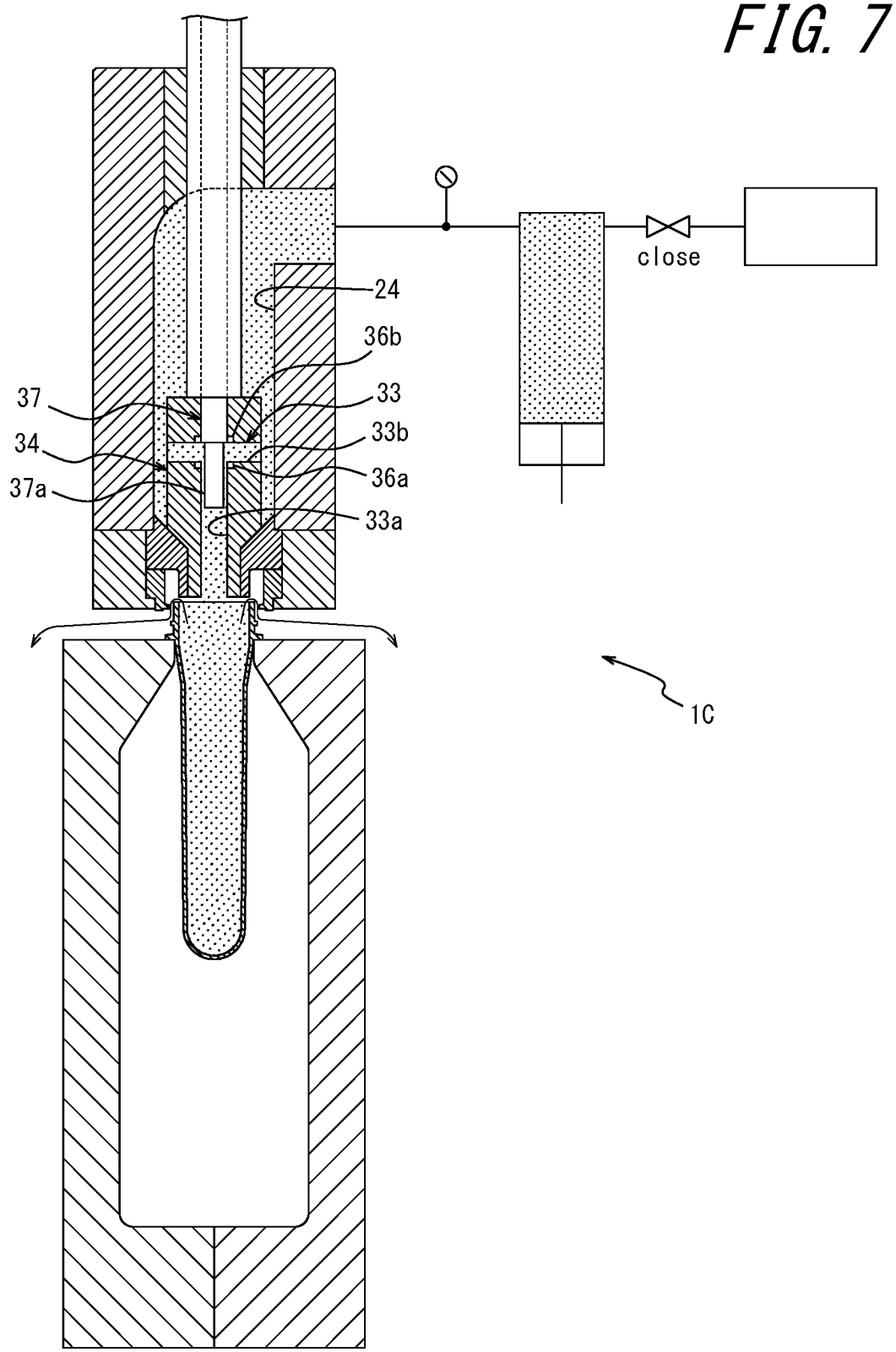
FIG. 7 is an explanatory diagram illustrating the liquid-containing container manufacturing device in a state in which an air discharge step is performed according to Embodiment 3 of the present disclosure.

Such a liquid-containing container manufacturing method according to this embodiment can be implemented, for example, using a liquid-containing container manufacturing device 1C of a structure illustrated in FIG. 6.

The liquid-containing container manufacturing device 1C has an opening-closing body 37 capable of opening and closing the preliminary supply path 33. The opening-closing body 37 serving also as a stretching rod extends in the vertical direction. A depression 37a that extends from the distal end toward the proximal end of the opening-closing body 37 and is continuous in the circumferential direction is formed on the outer peripheral surface of the opening-closing body 37. That is, the depression 37a forms a reduced diameter portion of the opening-closing body 37. Alternatively, the depression 37a may extend from the distal end toward the proximal end of the opening-closing body 37 and be intermittent in the circumferential direction (i.e. the depression 37a may be made up of a plurality of grooves). The opening-closing body 37 extends into the preliminary supply path 33 (more specifically, into the vertical flow path 33a). In the preliminary supply path 33 (more specifically, the vertical flow path 33a), an annular seal part 36a that can provide sealing between the preliminary supply path 33 and the opening-closing body 37 over the whole circumference is formed. The annular seal part 36a is located in a downstream part of the connecting portion between the vertical flow path 33a and the horizontal flow path 33b. Alternatively, the annular seal part 36a may be located downstream from the connecting portion between the vertical flow path 33a and the horizontal flow path 33b. An upper annular seal part 36b that can provide sealing between the vertical flow path 33a and the opening-closing body 37 over the whole circumference is located in an upstream part of the connecting portion between the vertical flow path 33a and the horizontal flow path 33b. Alternatively, the upper annular seal part 36b may be located upstream from the connecting portion between the vertical flow path 33a and the horizontal flow path 33b. The other structures are the same as those in the liquid-containing container manufacturing device 1B used in Embodiment 2.

With the liquid-containing container manufacturing method according to this embodiment, in the air discharge step, the opening-closing body 37 is moved in the retracting direction until the upper end of the depression 37a passes through the annular seal part 36a, to open the preliminary supply path 33. More specifically, in the air discharge step in this embodiment, the opening-closing body 37 is moved in the retracting direction until the upper end of the depression 37a reaches the lower end of the upper annular seal part 36b to open the preliminary supply path 33, as illustrated in FIG. 7. Thus, according to this embodiment, mixing of air into the supply path 24 can be prevented as in Embodiment 1.

The present disclosure is not limited to the foregoing embodiments, and various changes can be made without departing from the scope of the present disclosure.

For example, although the foregoing embodiments describe the case where the liquid-containing container manufacturing method according to the present disclosure is carried out using the liquid-containing container manufacturing device 1A of the structure illustrated in FIG. 1, the liquid-containing container manufacturing device 1B of the structure illustrated in FIG. 4, and the liquid-containing container manufacturing device 1C of the structure illustrated in FIG. 6 respectively, the liquid-containing container manufacturing method according to the present disclosure may be carried out using a liquid-containing container manufacturing device of another structure or the like.

Figure 8:
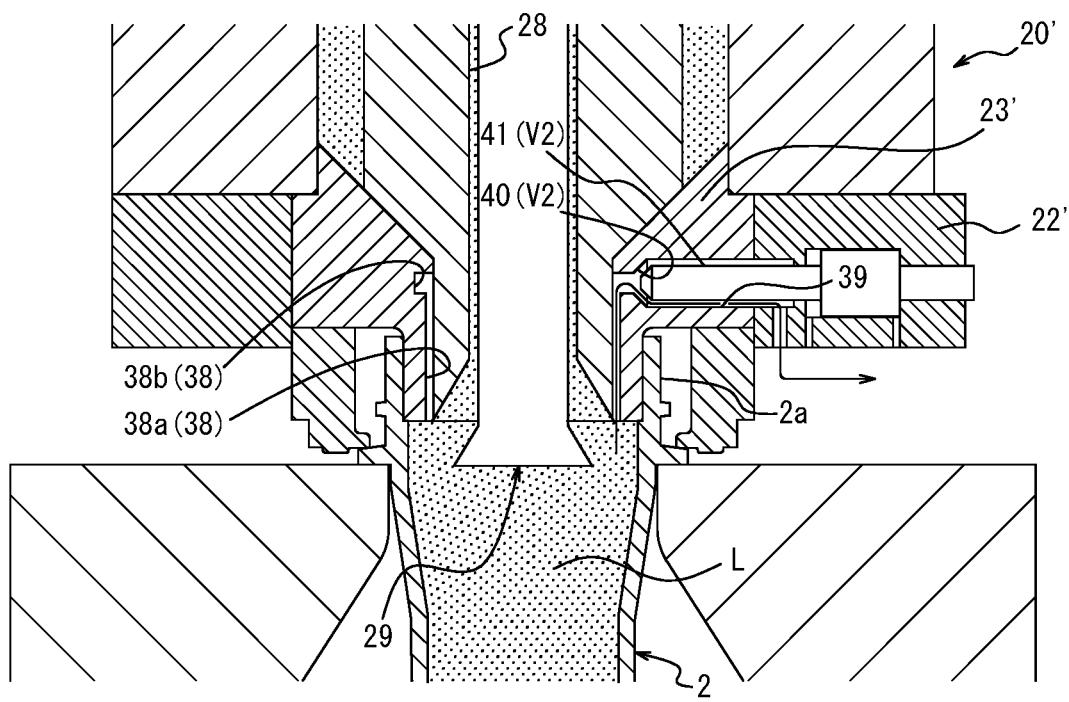
FIG. 8 is an explanatory diagram illustrating a liquid-containing container manufacturing device in a state in which an air discharge step is performed according to a modification of Embodiment 1 of the present disclosure.

Although the foregoing embodiments describe the case where the air discharge passage from the inside to the outside of the preform 2 is secured without making the nozzle unit 20 engage with the preform 2 in the air discharge step, the present disclosure is not limited to such. For example, as a modification of Embodiment 1, an air discharge step may be performed as illustrated in FIG. 8. In this modification, an exhaust depression 38 that extends from the distal end toward the proximal end of a blow nozzle 23' and is continuous or intermittent in the circumferential direction is formed on the inner peripheral surface of the blow nozzle 23'. The exhaust depression 38 in this modification is made up of a plurality of vertical grooves 38a arranged with spacing in the circumferential direction and an annular groove 38b connected to the upper end of each of the plurality of vertical grooves 38a. An exhaust flow path 39 through which the exhaust depression 38 communicates with the outside of a nozzle unit 20' is formed inside the blow nozzle 23' and a support block 22'. An exhaust on-off valve V2 is provided in the exhaust flow path 39. The exhaust on-off valve V2 is preferably an electromagnetic valve. The exhaust on-off valve V2 has an opened-closed part 40 provided in the exhaust flow path 39, and an exhaust opening-closing body 41 capable of opening and closing the opened-closed part 40. The opened-closed part 40 is located inside the blow nozzle 23' in this modification. In terms of reducing the amount of the liquid L that can enter from the exhaust depression 38 into the opened-closed part 40 of the exhaust flow path 39 in the liquid blow molding step, the opened-closed part 40 is preferably located as close to the inner peripheral surface of the blow nozzle 23' as possible. In the air discharge step in this modification, after the nozzle unit 20' (more specifically, the blow nozzle 23') engages with the preform 2 (more specifically, the mouth part 2a), the preliminary supply path 28 is opened by the opening-closing body 29 in a state in which the exhaust on-off valve V2 of the exhaust flow path 39 is open to supply the liquid L into the preform 2, thus discharging air inside the preform 2 to the outside through the exhaust depression 38 and the exhaust flow path 39. In Embodiments 2 and 3, too, the air discharge step may be performed with the same device and procedure as in this modification.

Although the foregoing embodiments describe the case where the pressurized liquid supply source 30 is a plunger pump, the present disclosure is not limited to such. Various structures, such as other types of pumps, may be used as long as the liquid L can be pressurized to the predetermined pressure and supplied into the preform 2.

The preform 2 may be of any of various shapes depending on the shape of the molded liquid-containing container C and the like.

REFERENCE SIGNS LIST 1A, 1B, 1C liquid-containing container manufacturing device
2 preform
2a mouth part
2b barrel part
10 mold for blow molding
11 cavity
20, 20' nozzle unit
20a nozzle unit body
21 main block
22, 22' support block
23, 23' blow nozzle
23a liquid supply port
24 supply path
24a seat part
25 supply port
26 seal body
26a preliminary supply port
27 shaft body
28 preliminary supply path
28a vertical flow path
28b horizontal flow path
29 opening-closing body (stretching rod)
29a opening-closing part
30 pressurized liquid supply source
30a cylinder
30b piston
31 supply tank
32 pressure gauge
33 preliminary supply path
33a vertical flow path
33b horizontal flow path
34 seal body
35 opening-closing body (stretching rod)
36a annular seal part
36b upper annular seal part
37 opening-closing body (stretching rod)
37a depression
38 exhaust depression
38a vertical groove
38b annular groove
39 exhaust flow path
40 opened-closed part
41 exhaust opening-closing body
C liquid-containing container
L liquid
P1 piping
V1 on-off valve
V2 exhaust on-off valve

The invention claimed is:

1. A liquid-containing container manufacturing method of manufacturing a liquid-containing container containing a content liquid from a synthetic resin-made preform using a mold for blow molding and a nozzle unit that includes: a nozzle unit body having an annular seat part provided in a supply path of a liquid; a seal body movable between a closed position at which the seat part is closed and an open position at which the seat part is open; and an opening-closing body capable of opening and closing a preliminary supply path that is formed inside the seal body and communicates with a part of the supply path upstream from the seat part, the liquid-containing container manufacturing method comprising:

an air discharge step of discharging air inside the preform placed in the mold for blow molding to outside, by opening the preliminary supply path by the opening-closing body in a state in which the seal body is at the closed position to supply the liquid from the preliminary supply path into the preform; and a liquid blow molding step of molding the preform into the liquid-containing container of a shape along an inner surface of the mold for blow molding, by moving the seal body from the closed position to the open position to supply the liquid pressurized into the preform through the seat part.

2. The liquid-containing container manufacturing method according to claim 1, further comprising a rod stretching step of stretching the preform in an axial direction by a stretching rod, before or during the liquid blow molding step, wherein the opening-closing body is the stretching rod.

3. The liquid-containing container manufacturing method according to claim 1, wherein in the air discharge step, the opening-closing body is moved in a projecting direction to open the preliminary supply path.

4. The liquid-containing container manufacturing method according to claim 1, wherein in the air discharge step, the opening-closing body is moved in a retracting direction to open the preliminary supply path.

5. The liquid-containing container manufacturing method according to claim 4, wherein a depression that extends from a distal end toward a proximal end of the opening-closing body and is continuous or intermittent in a circumferential direction is formed on an outer peripheral surface of the opening-closing body.

6. The liquid-containing container manufacturing method according to claim 2, wherein in the air discharge step, the opening-closing body is moved in a projecting direction to open the preliminary supply path.

7. The liquid-containing container manufacturing method according to claim 2, wherein in the air discharge step, the opening-closing body is moved in a retracting direction to open the preliminary supply path.

8. The liquid-containing container manufacturing method according to claim 7, wherein a depression that extends from a distal end toward a proximal end of the opening-closing body and is continuous or intermittent in a circumferential direction is formed on an outer peripheral surface of the opening-closing body.

* * * * *